United States Patent [19]
Walker et al.

[11] Patent Number: 5,645,315
[45] Date of Patent: Jul. 8, 1997

[54] CYCLE SADDLE FOR A FEMALE

[75] Inventors: Martin David Walker, 35 Halford Road, Berea, Durban, Kwa Zulu; Edward Joseph Khoury, Alberton, both of South Africa

[73] Assignee: Martin David Walker, Durban, South Africa

[21] Appl. No.: 587,036

[22] Filed: Jan. 16, 1996

[30] Foreign Application Priority Data

Jan. 13, 1995 [ZA] South Africa ............... 95/0265

[51] Int. Cl.$^6$ ................................ B62J 1/00
[52] U.S. Cl. .................... 297/215.1; 297/202; 297/214; 297/188.08
[58] Field of Search .................. 297/195.1, 202, 297/214, 215.1, 215.11, 215.16, 452.27, DIG. 1, DIG. 2, 188.13, 188.08, 467, 195.11, 203, 196, 188.1

[56] References Cited

U.S. PATENT DOCUMENTS

| | | | |
|---|---|---|---|
| D. 156,038 | 11/1949 | Ruppert | 297/215.11 X |
| 240,905 | 5/1881 | Harrington | 297/196 X |
| 635,234 | 10/1899 | Chance | 297/195.11 X |
| 4,502,727 | 3/1985 | Holcomb et al. | 297/215.1 X |
| 5,011,222 | 4/1991 | Yates et al. | 297/215.1 |
| 5,165,752 | 11/1992 | Terry | 297/214 |
| 5,356,205 | 10/1994 | Calvert et al. | 297/214 X |

FOREIGN PATENT DOCUMENTS

| | | | |
|---|---|---|---|
| 1193760 | 11/1959 | France | 297/215.1 |
| 593961 | 2/1978 | U.S.S.R. | 297/188.13 |
| 19802 | 6/1913 | United Kingdom | 297/215.11 |

*Primary Examiner*—Milton Nelson, Jr.
*Attorney, Agent, or Firm*—Ladas & Parry

[57] ABSTRACT

A cycle saddle for a female, comprising a saddle body that defines a support surface on which a female can be supported, the support surface being profiled to conform anatomically to the shape of a female's buttock and genital regions. The saddle body comprises a cushion section that is adhesively bonded to a rigid moulded plastics base section, with the cushion section having a posterior region that defines a raised laterally flared cantle, and an intermediate region and an anterior region transitioning from the posterior region to form a horn section. The anterior region is raised thereby forming together with the posterior and intermediate regions, a continuous longitudinally concave profile for snugly supporting the buttock, perineal and pubic regions of a female.

10 Claims, 3 Drawing Sheets

CYCLE SADDLE FOR A FEMALE

BACKGROUND OF THE INVENTION

1. Field of the Invention

This invention relates to a cycle saddle for a female.

2. Description of the Prior Art

Cycle saddles and in particular, bicycle saddles, are well known. It is known that female cyclists in particular, experience discomfort and pain in the genital area when seated on cycle saddles not designed specifically for the female anatomy. In 1897, Mary F Henderson disclosed in her U.S. patent application Ser. No. 576,310 a bicycle saddle having two soft cushion lobes with a depression disposed between them. The Henderson saddle is substantially flat and thus does not provide adequate posterior support for the buttock muscles of cyclists who wish to assume an aero-dynamically efficient position with the upper body tilted over forwards. Although the idea of a hollowed out intermediate region is evident in Henderson's saddle to relieve pressure in the genital region of a person seated thereon, it fails to provide adequate anterior support for a female cyclist's pubic region.

Beylet et al disclosed in U.S. Pat. No. 5,076,642 dated 1991, a high performance bicycle saddle providing support for the buttock muscles of a cyclist seated thereon in a "hunched over" cycling position. This saddle is, however, not anatomically contoured to conform to the genital region of a female cyclist. In particular, it does not provide adequate anterior support for supporting the pubic region of a female cyclist. As a result of the lack of anterior support, forward sliding of a cyclist along the saddle will not be prevented. Forward sliding with this saddle design will occur particularly during slight alterations of seating position to alleviate discomfort. Furthermore, this bicycle saddle does not conform to the shape of the whole of a female cyclist's genital region, pressure points are created causing pain and discomfort.

PCT Patents WO 91/01244 and WO 92/11175 in the names of Yates et al, both disclose anatomically conforming cycle saddles having elongated horn sections transitioning rearwardly into laterally flared raised cantles, the horn sections having a gentle cavity disposed along upper surfaces thereof. Similarly, as for U.S. Pat. No. 5,076,642, these patents do not provide adequate anterior support for supporting the pubic region of a female cyclist seated on the saddles. Thus forward sliding can take place along the saddles causing pain and discomfort. Furthermore, as the Yates et al bicycle saddles do not conform to the shape of the whole of a female cyclist's genital region, pressure points are created causing pain and discomfort. As such, the Yates et al saddles force the body of a female cyclist seated thereon to mould to the contours of the seat and thereby effectively oppose the body contours resulting in the saddle being deficient in distributing the body weight over a wide surface area, thus causing pressure and pain in the genital region.

SUMMARY OF THE INVENTION

It is an object of this invention to provide a cycle saddle for females that overcomes the problems encountered with existing known cycle saddles.

According to the invention there is provided a cycle saddle for a female, comprising a saddle body defining an operative posterior region, an operative anterior region and an operative intermediate region disposed between the posterior and the anterior regions, the posterior region defining an operatively raised laterally flared cantle that defines a support surface that extends operatively downwardly from the region of the sacrum of a female operatively supported on the saddle body, to conform substantially to the shape of the female's buttocks, the intermediate and anterior regions forming a horn section transitioning from the posterior region, the intermediate region and the anterior region defining a support surface conforming to and providing support for the perineal and pubic regions of a female operatively seated thereon, with the support surface defined by the anterior region being operatively raised at its furthermost anterior end between 40 and 70 mm with respect to the support surface defined by the intermediate region, thereby permitting the posterior, intermediate and anterior regions to define a continuous substantially longitudinally concave support surface for snugly supporting the buttock, perineal and pubic regions of a female supported on the saddle body.

The operative upper side of said concave support surface of the saddle body may be substantially flat in a lateral direction thereof.

The support surface of the posterior region of the saddle body may be operatively raised at its furthermost posterior end between 80 and 120 mm with respect to the support surface defined by the intermediate region.

The saddle body may comprise a substantially rigid base section and a cushion section of cushioning material that defines said support surface and that is attached to the base section, the cushion section defining a cavity in the operative upper support surface of the intermediate region, that is disposed for supporting the perineal and vulval region of a female seated thereon, the cavity being filled in with cushioning material that is relatively softer than the cushioning material of the remainder of the cushion section.

The saddle body may include a fabric cover sheet for covering the cushioning section thereof.

The base section of the saddle body may define a compartment having a closable lid, in an operative underside of said base section at the posterior region of the saddle body, in which articles can be stowed.

The saddle body may include mounting means secured to the base section thereof, for mounting the cycle saddle on a cycle.

The mounting means may be in the form of a resiliently deformable rod that is profiled to permit it to be secured to the operative underside of the base section of the saddle body to provide operative resilient support therefor, and a mounting formation for mounting the cycle saddle on a cycle.

The cushioning material of the cushion section may be synthetic plastic foam material.

The base section of the saddle body may be of moulded synthetic plastic material.

BRIEF DESCRIPTION OF THE DRAWINGS

The invention is now described, by way of a non-limiting example with reference to the accompanying diagrammatic drawings. In the drawings.

DESCRIPTION OF THE PREFERRED EMBODIMENTS

Figure 1:
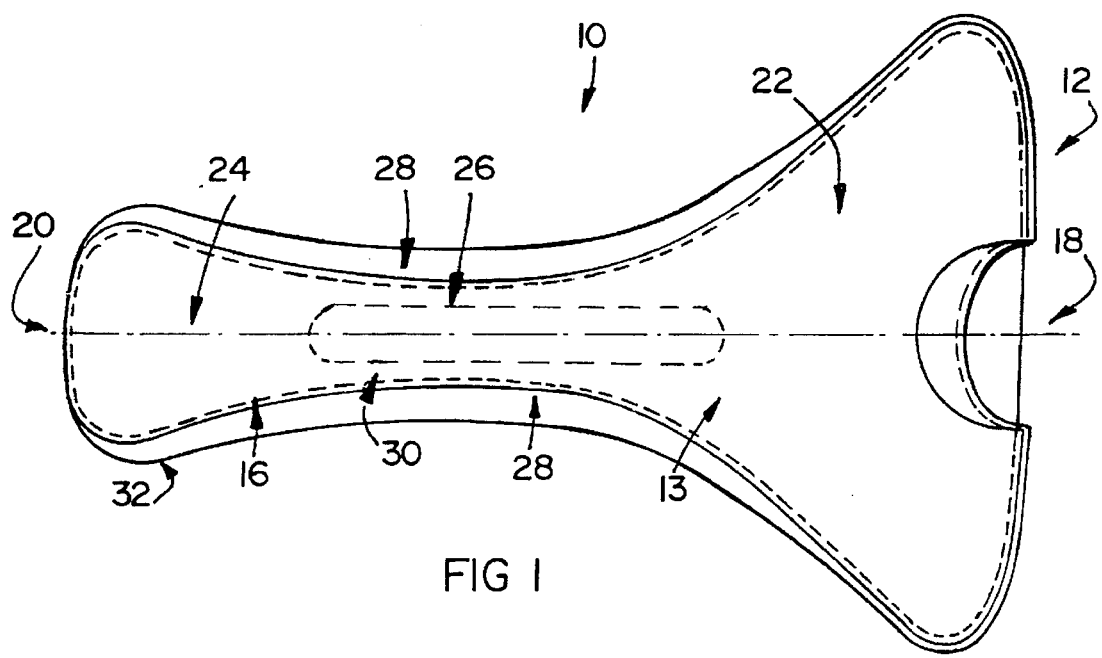
FIG. 1 shows a plan view of a cycle saddle in accordance with the invention.
Figure 2:
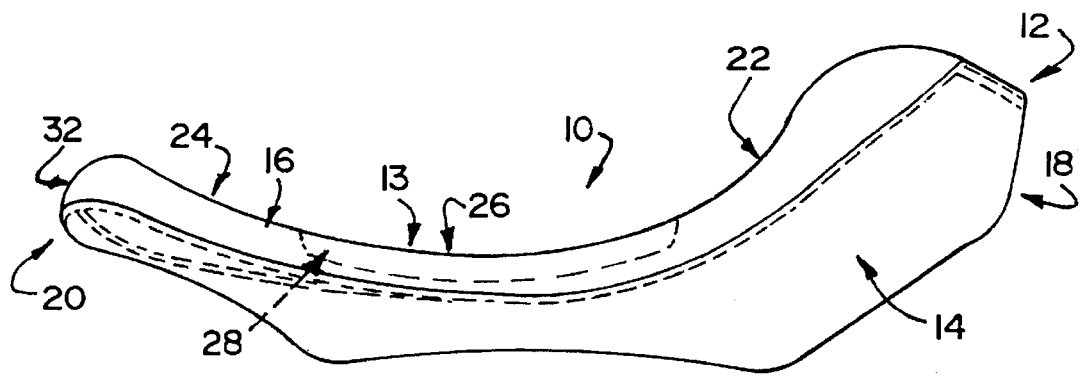
FIG. 2 shows a side view of the cycle saddle of FIG. 1.
Figure 3:
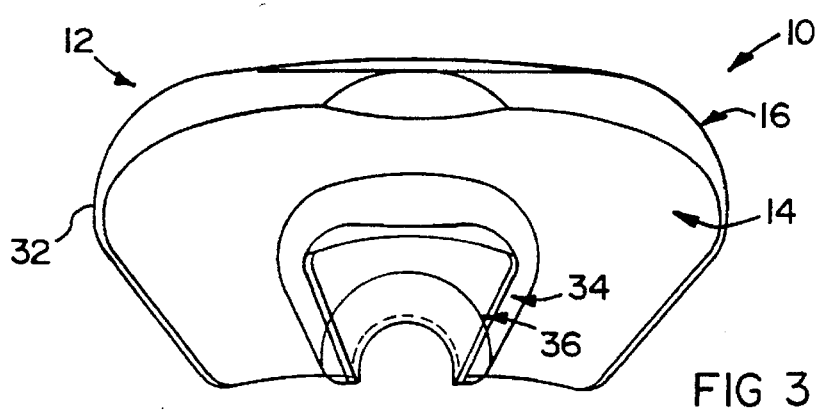
FIG. 3 shows a posterior end view of the cycle saddle of FIG. 1.
Figure 4:
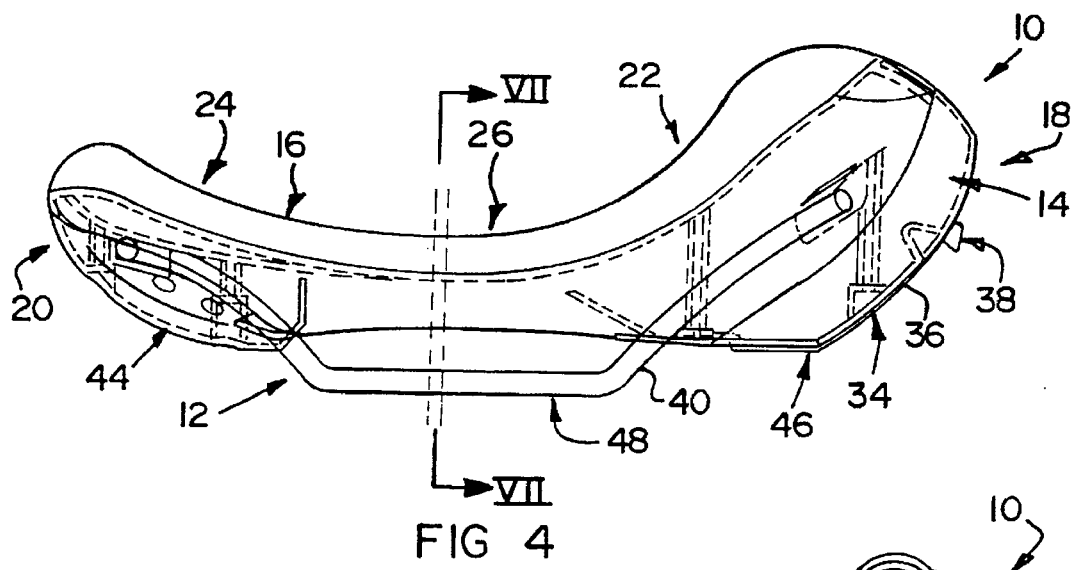
FIG. 4 shows a side view of the cycle saddle of FIG. 1, showing hidden detail.
Figure 5:
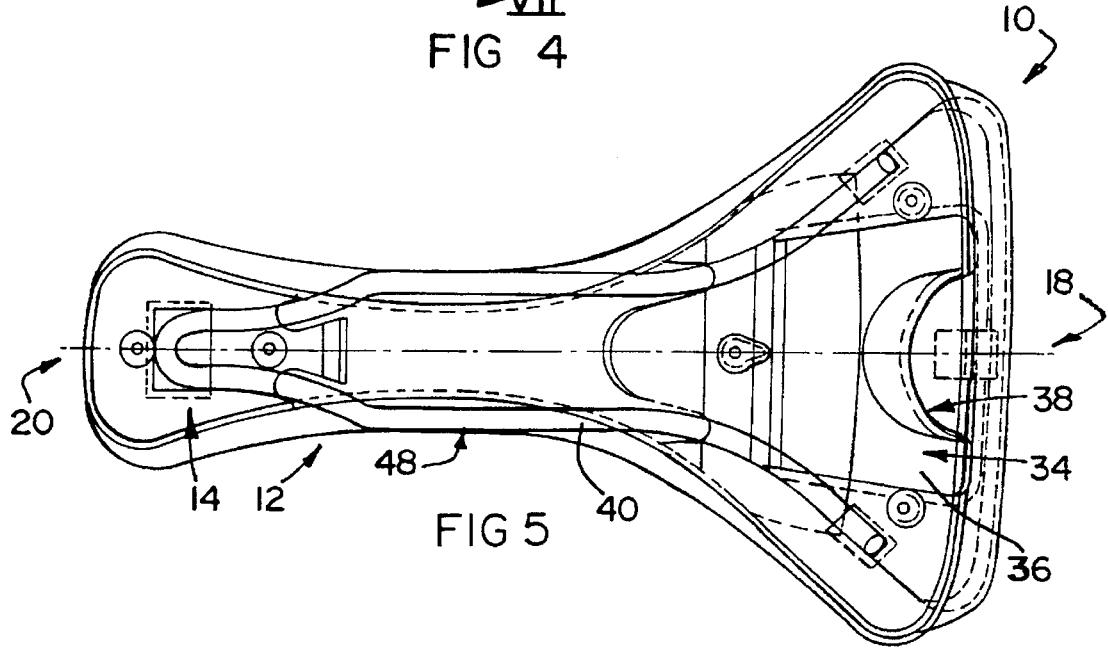
FIG. 5 shows a view of the operative underside of the cycle saddle of FIG. 1, showing hidden detail.
Figure 6:
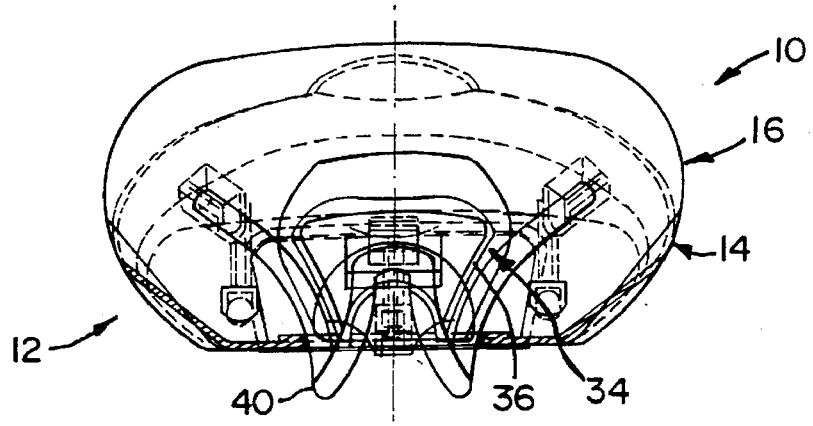
FIG. 6, shows a anterior end view of the cycle saddle of FIG. 1, showing hidden detail.
Figure 7:
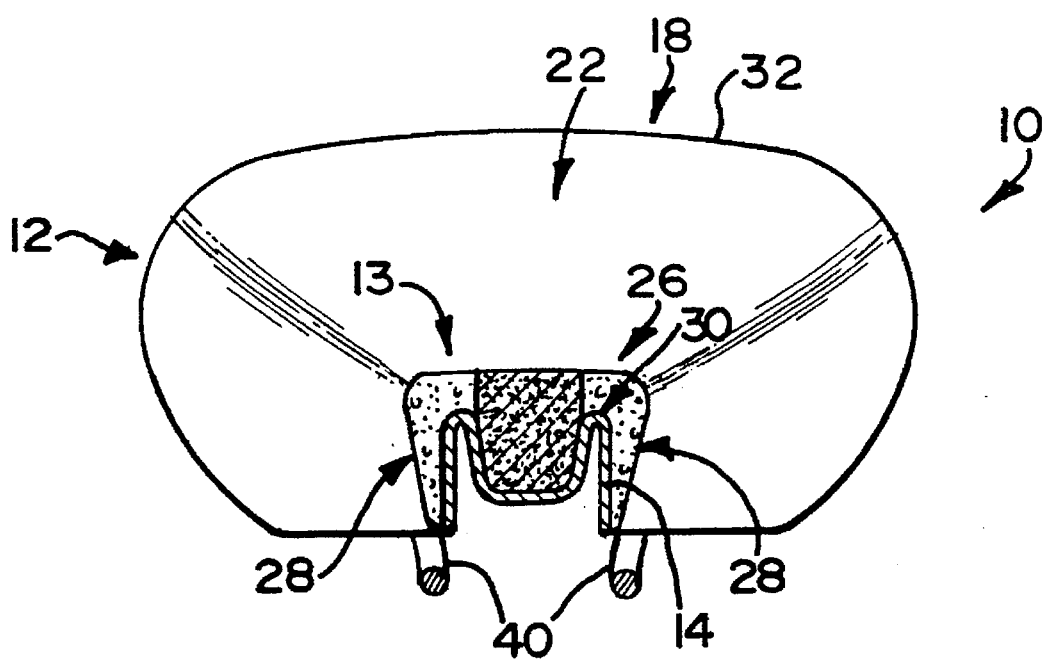
FIG. 7 shows a sectional end view of the cycle saddle of FIG. 1, sectioned along section line VII—VII of FIG. 4.

Referring to the drawings, a cycle saddle for a female, in accordance with the invention, is designated generally by the reference numeral 10. The cycle saddle 10 comprises a saddle body 12 that defines a support surface 13 on which a female can be supported, the support surface 13 being profiled to conform anatomically to the shape of a female's buttock and genital regions.

The saddle body 12 comprises a substantially rigid moulded plastics base section 14 and a cushion section 16 of plastics foam material that defines said support surface 13 and that is adhesively bonded to the base section 14.

The cushion section 16 of the saddle body 12 defines an operative posterior end 18 and an operative anterior end 20 and more particularly, defines an operative posterior region 22, an operative anterior region 24 and an operative intermediate region 26 disposed between the posterior and anterior regions. The posterior region 22 defines an operatively raised laterally flared cantle that defines a posterior part of the support surface 13, that extends operatively downwardly and anteriorly from the region of the sacrum of a female operatively supported on the saddle body 12, to conform substantially to the shape of the female's buttocks.

The intermediate region 26 and the anterior region 24 together form a horn section transitioning from the posterior region 22. As such, the intermediate region 26 defines an intermediate part of the support surface 13 that conforms substantially to the shape of the perineal and vulval region of a female operatively seated on the saddle body 12. The anterior region 24 defines an anterior part of the support surface 13 that conforms substantially to the shape of the pubic region of a female operatively seated on the saddle body 12.

The part of the support surface that is defined by the anterior region 24 is operatively raised with respect to the part of the support surface defined by the intermediate region, thereby permitting the posterior, intermediate, and anterior regions together to define the support surface 13, the support surface having a continuous substantially longitudinally concave profile for snugly supporting the buttock, perineal and pubic regions of a female supported on the saddle body 12. More particularly, the part of the support surface defined by the posterior region 22 of the cushion section 16 is operatively raised at the furthermost posterior end thereof, in the region of 100 mm with respect to the part of the support surface defined by the intermediate region 26. Furthermore, the part of the support surface defined by the anterior region 24 of the cushion section 16 is operatively raised at the furthermost anterior end thereof, in the region of 57 mm with respect to the support surface defined by the intermediate region. Furthermore, the radius of curvature of the concave support surface 13 of the cushion section 16, is 207 mm for a region thereof extending between the furthermost anterior end of the support surface 13 and a region where the anterior region transitions into the intermediate region. The radius of curvature of the part of the support surface 13 defined by the posterior region 22 of the cushion section 16, commences with a radius of approximately 100 mm extending from a region where the intermediate region and the posterior region transition, to a position longitudinally intermediate the posterior region, whereafter the radius of curvature of the support surface defined by the posterior region is approximately 50 mm until the operative uppermost point of concavity of the support surface 12.

The operative upper side of said concave support surface 13 of the cushion section 16 is substantially flat in a lateral direction thereof, with the saddle body 12 defining support surfaces 28 that slope operatively downwardly from the support surface 13 to provide lateral support for a female seated on the saddle body 12. More particularly, the support surfaces 28 of the cushion section 16 taper in a longitudinal direction thereof when viewed in plan view from the posterior region 22 and the anterior region 24 toward the intermediate region. As such, the part of the support surface 13 defined by the anterior region 24, defines a bulbous profile when viewed in plan view, for anatomically supporting the pubic region of a female seated on the saddle body 12.

The cushion section 16 of the saddle body 12 defines an elongate slot-like cavity 30 that is filled in with plastics foam material, in the part of the support surface 13 that is defined by the intermediate region 26. The cavity 30 is disposed for supporting the perineal and vulval regions of a female seated on the saddle body 12, with the cavity being filled in with plastics foam material that is relatively softer than the plastics foam material of the remainder of the cushion section 16.

The saddle body 12 includes a fabric cover sheet 32 for covering the cushioning section 16 thereof.

The base section 14 of the saddle body 12 defines a compartment 34 having a closable lid 36, in an operative underside of the base section 14 at the posterior end 18 of the saddle body 12, in which articles can be stowed. More particularly, the lid 36 of the compartment 34 defines a clip formation 38 for manipulating the lid 36 for opening and closing it.

The saddle body 12 includes mounting means in the form of a resiliently deformable "spring steel" rod 40 that is profiled to permit it to be secured to the operative underside of the base section 14 of the saddle body 12 to provide operative resilient support for a female seated thereon, and that permits mounting of the cycle saddle 10 on a cycle. The rod 40 is secured to the operative underside of the base section 14 of the saddle body 12 by means of two brackets 44 and 46 that are operatively bolted to the operative underside of the base section 14 of the saddle body 12 at its anterior and posterior ends, respectively, for thereby securing the rod 40 to the base section 14. A region 48 of the rod 40 defines a configuration permitting mounting of the cycle saddle on a cycle.

It must be appreciated that the dimensions of the saddle body of the cycle saddle of the invention may vary according to the different anatomic dimensions of females to be supported thereon, while still incorporating the general shape and configuration of the saddle body as described hereinabove. In this regard, it is envisaged by the Applicant that cycle saddles will be constructed having different radii of curvature for use by females of different sizes.

An advantage of the cycle saddle of the invention is that it provides for snug anatomical support of a female operatively seated thereon. As such, the raised cantle of the saddle body of the cycle saddle is configured to provide optimum support for the buttocks of a female that allows increased pedal thrust by the cyclist. Most importantly, the raised support surface defined by the anterior region of the saddle body prevents operative forward sliding of the female cyclist along the horn section of the saddle body. It has been found by the Applicant in tests conducted with female cyclists using a range of different known cycle saddles, that all the known saddles tested did not prevent forward sliding. So-called 'forward sliding' is known to cause pain in the region of the clitoris labia majora with attendant pain during micturition, giving rise to a condition in females commonly known as 'swollen genitals'.

The shape and configuration of the support surface of the saddle body of the cycle saddle of the invention, allows pressure to be taken off, particularly the sensitive perineal region of a female seated thereon, and to be re-distributed over a greater surface area.

We claim:

1. A cycle saddle for a female, comprising a saddle body defining an operative posterior region, an operative anterior region and an operative intermediate region disposed between the posterior and the anterior regions, the posterior region defining an operatively raised laterally flared cantle that defines a support surface that extends operatively downwardly from a region of the sacrum of a female operatively supported on the saddle body, to conform substantially to the shape of the female's buttocks, the intermediate and anterior regions forming a horn section transitioning from the posterior region, the intermediate region and the anterior region defining a support surface conforming to and providing support for perineal and pubic regions of a female operatively seated thereon, with the support surface defined by the anterior region being operatively raised at a furthermost anterior end thereof between 40 and 70 mm with respect to the support surface defined by the intermediate region, thereby permitting the posterior, intermediate and anterior regions to define a continuous substantially longitudinally concave support surface for snugly supporting buttock, perineal and pubic regions of a female supported on the saddle body.

2. A cycle saddle as claimed in claim 1, wherein the support surface of the posterior region of the saddle body is operatively raised at a furthermost posterior end between 80 and 120 mm with respect to the support surface defined by the intermediate region.

3. A cycle saddle as claimed in claim 1, wherein an operative upper side of said concave support surface of the saddle body is substantially flat in a lateral direction thereof.

4. A cycle saddle as claimed in claim 3, wherein the saddle body comprises a substantially rigid base section and a cushion of cushioning material that defines said support surfaces of the posterior, intermediate and anterior regions and that is attached to the base section, the cushion section defining a cavity in an operative upper side of the support surface of the intermediate region, that is disposed for supporting a perineal and vulval region of a female seated thereon, the cavity being filled in with cushioning material that is relatively softer than the cushioning material of the cushion section not defining the cavity.

5. A cycle saddle as claimed in claim 4, wherein the saddle body includes a fabric cover sheet for covering the cushioning section thereof.

6. A cycle saddle as claimed in claim 4, wherein the base section of the saddle body defines a compartment having a closable lid, in an operative underside of said base section at the posterior region of the saddle body, in which articles can be stowed.

7. A cycle saddle as claimed in claim 4, wherein the saddle body includes mounting means secured to the base section thereof, for mounting the cycle saddle on a cycle.

8. A cycle saddle as claimed in claim 7, wherein the mounting means is in the form of a resiliently deformable rod that is profiled to permit it to be secured to an operative underside of the base section of the saddle body to provide operative resilient support therefor, and that permits mounting of the cycle saddle on a cycle.

9. A cycle saddle as claimed in claim 4, wherein the cushioning material of the cushion section is synthetic plastic foam material.

10. A cycle saddle as claimed in claim 4, wherein the base section of the saddle body is of moulded synthetic plastic material.

* * * * *